US011968188B2

(12) United States Patent
Haddad et al.

(10) Patent No.: US 11,968,188 B2
(45) Date of Patent: Apr. 23, 2024

(54) SECURE EMAIL TRANSMISSION VIA TREASURY PORTAL

(71) Applicant: Bank of America Corporation, Charlotte, NC (US)

(72) Inventors: Linda Haddad, Concord, CA (US); Katherine Jameson, New York, NY (US); Alex Y. Yang, Woodinville, WA (US); Neha Joshi, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 393 days.

(21) Appl. No.: 17/552,559

(22) Filed: Dec. 16, 2021

(65) Prior Publication Data

US 2023/0198958 A1 Jun. 22, 2023

(51) Int. Cl.
| | |
|---|---|
| *H04L 9/40* | (2022.01) |
| *G06F 9/54* | (2006.01) |
| *H04L 9/06* | (2006.01) |
| *H04L 9/32* | (2006.01) |
| *H04L 51/214* | (2022.01) |
| *H04L 51/42* | (2022.01) |

(52) U.S. Cl.
CPC ............ *H04L 63/0428* (2013.01); *G06F 9/54* (2013.01); *G06F 9/547* (2013.01); *H04L 9/0643* (2013.01); *H04L 9/3226* (2013.01); *H04L 51/214* (2022.05); *H04L 51/42* (2022.05)

(58) Field of Classification Search
CPC . H04L 63/0428; H04L 9/0643; H04L 9/3226; H04L 51/214; H04L 51/42; H04L 9/3247; H04L 51/212; H04L 63/083; G06F 9/54; G06F 9/547
See application file for complete search history.

(56) References Cited

U.S. PATENT DOCUMENTS

2006/0277592 A1* 12/2006 Brown .................... H04L 51/00
726/1
2018/0054414 A1* 2/2018 LeVasseur ............. G06Q 10/10

OTHER PUBLICATIONS

"Back End Web Architecture," https://www.codecademy.com/article/back-end-architecture, Codecademy, Retrieved on Dec. 12, 2021.
"BofA Adds Three APIs to CashPro to Advance Real-Time Treasury," https://newsroom.bankofamerica.com/press/corporate-and-investment-banking-sales-and-trading-treasury-services/bofa-adds-three, Bank of America Corporation, Oct. 6, 2020.
"BofA Merrill Adds Biometrics and Integrated Token to CashPro Mobile," Bank of America Corporation, Jul. 2, 2018.

(Continued)

*Primary Examiner* — Huan V Doan
(74) *Attorney, Agent, or Firm* — Weiss & Arons LLP

(57) ABSTRACT

Apparatus and methods disclosed herein provide technical solutions improving the security of email messages. An email message may be encrypted so that a predetermined passcode is not required to access the email message. Apparatus and methods may route email messages through a remote portal. The email message may only be transmitted to the recipient via the portal. In some instances, the contents of an email message may not be transmitted from the portal to the recipient. Rather, the recipient may only access the email message from within the portal. Such restricted access may be preferably less complex because the recipient's computer terminal may automatically connect to the portal.

16 Claims, 6 Drawing Sheets

(56) References Cited

OTHER PUBLICATIONS

Zwicky et al., "Building Internet Firewalls, 2$^{nd}$ Edition," https://www.oreilly.com/library/view/building-internet-firewalls/1565928717/ch04.html, O'Reilly Media, Inc., Dec. 6, 2021.

Sam Rhea, "Cloudflare Access Now Supports RDP," Cloudflare, Inc., Feb. 21, 2019.

"CashPro: Your Complete Digital Banking Platform," Bank of America Corporation, Retrieved on Dec. 2, 2021.

"Frontend vs. Backend," https://www.geeksforgeeks.org/frontend-vs-backend/, Geeks for Geeks, Aug. 31, 2021.

Lisa McKnight, "How Does Email Work," https://www.namecheap.com/guru-guides/how-does-email-work/, Namecheap, Inc., May 31, 2021.

"How Does the Internet Work?" http://web.stanford.edu/class/msande91si/www-spr04/readings/week1/InternetWhitepaper.htm, Pomeroy IT Solutions, 2002.

Priyanka Kumari, "How to Know if Two IP Addresses are in the Same Network," https://www.linkedin.com/pulse/how-know-two-ip-addresses-same-network-priyanka-kumari/, LinkedIn Corporation, Aug. 1, 2019.

"How to Tell if Phones and Computers on Same Subnet," https://support.8x8.com/equipment-devices/network-devices/how-to-tell-if-phones-and-computers-are-on-the-same-subnet, 8x8, Inc., Dec. 12, 2021.

"Public-key Cryptography," https://en.wikipedia.org/wiki/public-key_cryptography, Wikimedia Foundation, Inc., May 14, 2018.

"The Risks of Remote Desktop Security In 2021 & How to Overcome Them," https://biz30.timedoctor.com/remote-desktop-security/, Time Doctor, Retrieved on Nov. 17, 2021.

"The Seven Layers of the OSI Model," https://www.just.edu.jo/-mzali/courses/summer15/cis442/files/osi-model.htm, StudyNotes.net, Retrieved on Nov. 29, 2021.

Pamela Fox, "Transmission Control Protocol (TCP)," Khan Academy, https://www.khanacademy.org/computing/computers-and-internet/xcae6f4a7ff015e7d:the-internet/xcae6f4a7ff015e7d:transporting-packets/a/transmission-control-protocol--tcp, Retrieved on Dec. 6, 2021.

"What are the Security Risks of RDP? RDP Vulnerabilities," https://www.cloudflare.com/learining/access-management/rdp-security-risks/, CloudFlare, Inc., Retrieved on Nov. 17, 2021.

"What is an Email Client? And How to Choose One," https://www.getmailbird.com/what-is-an-email-client/, Retrieved on Dec. 8, 2021.

Sam Heiny, "What you Need to Know About Security Risks of Remote Desktop Protocol Over the Internet," https://www.imperosoftware.com/us/what-to-know-about-rdp-security/, Impero Solutions Inc., Jul. 10, 2019.

\* cited by examiner

SECURE EMAIL TRANSMISSION VIA TREASURY PORTAL

FIELD OF TECHNOLOGY

This application describes apparatus and methods for overcoming technical challenges associated with on-demand encryption of email communication.

BACKGROUND

Conventional email messages and associated systems for email communication are relatively unsecure and are often targets of cyberattacks. An email message is typically created using an email client program running on a sender's computer terminal. An email client may also provide a user client for creating and managing email messages. For example, an email client may allow a user to create filters that automatically direct emails to a specific folder for later viewing. An email client may allow a user to archive and delete email messages.

The email client prepares the email message for transmission by combining the message content with header information. Header information may include a recipient address, subject, date, and time. After the email message has been composed by the client program, the email message is routed from the sender's computer terminal to a recipient computer terminal.

The email client may be capable of sending and receiving email messages using a variety of communication and transmission protocols. Commonly used protocols for email communication include Post Office Protocol (POP), Internet Message Access Protocol (IMAP) and Simple Mail Transfer Protocol (SMTP). The email message may be routed through multiple computer until it arrives at the recipient's computer terminal.

The protocols may split an email message into multiple packets. Each packet may be sent independently from the sender to the recipient. Each packet may utilize a different route of computer terminals to arrive at the recipient computer terminal. The protocols provide mechanisms that allow routing computers to track which packets were successfully received, which packets were lost, and which packet may have been sent twice.

The communication protocols also provide mechanisms for reassembling received packets into the original transmitted email message. An illustrative protocol for email transmission may include a combination of Transmission Control Protocol ("TCP") layered on top of an internet protocol ("IP") that utilizes internet connected computers to route email message packets.

The typical sender or recipient of an email message is unaware of the technical details of how an email message is transmitted or routed. The popularity of email communications is due, at least in part, to insulating users from the technical complexities that control email communication.

However, typical email messages are transmitted as packets that include plain text. Plain text is readable by the interim computer systems that route email message packets to a destination. Absent any encryption, any computer system that participates in routing an email message can intercept and read contents of the email message. Conventional methods for encrypting email messages may include adding another layer of software on top of the TCP/IP protocols.

For example, another software program may encrypt an email message so that the contents of each packet are not viewable as plain text. However, such a scheme has various technical shortcomings.

First, encryption software used by the sender must be compatible with the sender's and recipient's email client programs. For example, the recipient's email client must be able to decrypt the email message encrypted by the send's email client.

Second, the sender must proactively call the encryption software to encrypt a target email message. The sender may not wish to encrypt all outgoing messages because of a computational load imposed on the sender's computer terminal, incompatibility with a recipient's email client or because some email messages do not include any confidential information. Thus, the conventional encryption techniques require regular human intervention, exacerbating the risk of human error and undermining the convenience of email communication.

Thirdly, an encrypted email message must be able to be decrypted and viewed by a recipient's email client program. Conventionally, the recipient must enter a passcode to access an encrypted message. This poses an additional hurdle that undermines the convenience of email communication. The recipient may also decrypt the email message on a computer terminal that is inherently unsecure. For example, the recipient may be accessing their email on a public internet station. Even if the email message was secured during transmission, confidential contents are still at risk of exposure at a time the message is read by the recipient.

It would be desirable to provide improvements to conventional techniques for encrypting email messages. For example, it would be desirable to provide technical improvements that provide encryption of email messages without requiring input from a sender. It would be desirable to provide technical improvements that allow encrypted email messages to be read by a recipient without requiring the recipient to enter a passcode to decrypt the message.

It would be it would be desirable to provide technical improvements that prevent an encrypted email message from being decrypted on an insecure computer terminal. It would be desirable to provide the aforementioned technical improvements without compromising the convenience of email communication. Accordingly, it would be desirable to provide apparatus and methods for SECURE EMAIL TRANSMISSION VIA TREASURY PORTAL.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
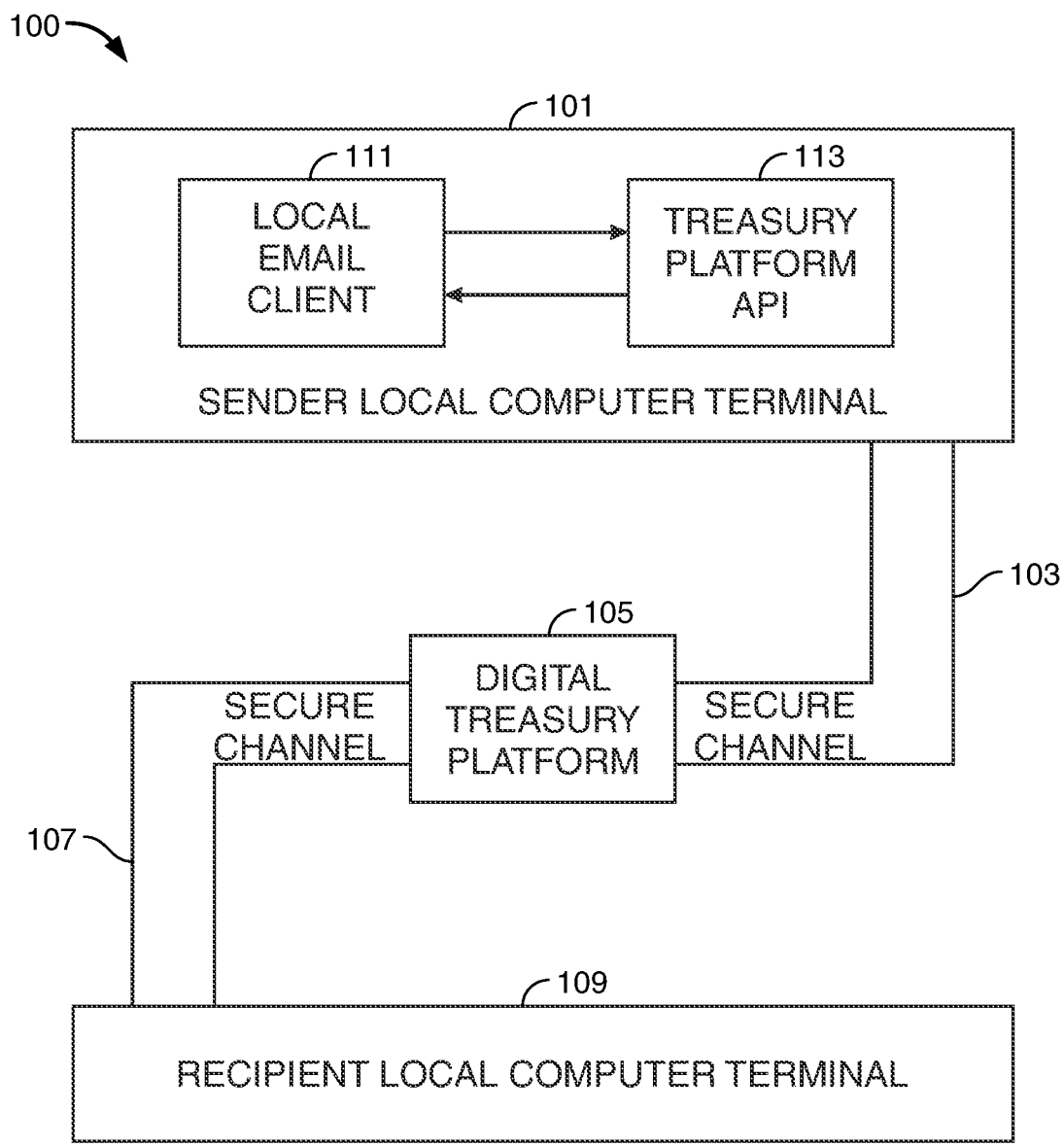
FIG. 1 shows illustrative components of a system architecture in accordance with the principles of the disclosure.

Apparatus and methods disclosed herein provide improvements to technical solutions for encrypting email messages. A system that automatically controls transmission of encrypted email messages is provided. The system may include a computer terminal. A computer terminal may include one or more processor circuits. A processor circuit may control overall operation of the computer terminal. A processor circuit may include hardware, such as one or more integrated circuits that form a chipset. The hardware may include digital or analog logic circuitry configured to perform any suitable (e.g., logical) operation.

A computer terminal may include one or more of the following hardware components: I/O circuitry, which may include a transmitter device and a receiver device which interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

A computer terminal may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by a computer terminal may be stored within the non-transitory memory and/or other storage media. Software applications may provide computer readable instructions to the one or more processors that enable a computer terminal to perform various functions. For example, the non-transitory memory may store software applications such as an operating system, application programs (e.g., email client and treasury interface), machine learning algorithms, artificial intelligence models, and an associated database. Alternatively, some or all of computer executable instructions of a software application may be embodied in hardware or firmware components of a computer terminal.

Software applications may include computer executable instructions for invoking user functionality related to communication, such as email, short message service ("SMS"), and voice input and speech recognition applications. Software application programs may utilize one or more algorithms that process received executable instructions, perform power management routines, encrypt email messages, route email messages or other suitable tasks.

Software applications may utilize computer-executable instructions, such as program modules, executed by one or more processors. Generally, program modules include routines, programs, objects, components, data structures, etc. that perform particular tasks or implement particular abstract data types. A computer terminal may be operational with distributed computing environments where tasks are performed by remote processing devices that are linked through a communications network. In a distributed computing environment, program modules may be located in both local and remote computer storage media including memory storage devices. A computer terminal may rely on a network of remote servers hosted on the internet to store, manage, and process data (e.g., "cloud computing" and/or "fog computing").

A computer terminal may be part of one, two or more networks. Each network may be associated with its own security and data access rules. A computer terminal may support establishing network connections to one or more remote computing systems, such as treasury platform. Illustrative network connections may include a local area network ("LAN") and a wide area network ("WAN").

When used in a LAN networking environment, a computer terminal may be connected to the LAN through a network interface or adapter. A computer terminal may include a communication circuit. The communication circuit may include a network interface card or adapter. When used in a WAN networking environment, a computer terminal may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computer terminal may be operated in a client-server configuration to permit a user to retrieve web pages from a web-based server. Web browsers can be used to display and manipulate data on web pages.

A computer terminal may include components, such as a display, battery, speaker, and antennas. Components of a computer terminal may be linked by a system bus, wirelessly or by other suitable interconnections. Components of a computer terminal may be present on one or more circuit boards. In some embodiments, the components may be integrated into a single chip. The chip may be silicon-based.

Computer readable instructions when executed by a processor on a computer terminal may provide user tools for composing and viewing an email message. For example, the computer readable instructions may implement an email client application program. The system may include an email client operating locally on a computer terminal ("local email client"). The local email client may provide access to a "mailbox" where electronic mail is stored. A user may access the mailbox to view received email messages. The mailbox may include folders, (e.g., inbox, outbox, junk) for organizing email messages. The local email client may allow the user to scan mail, copy, delete, or forward email messages to another user.

When a user sends an email message, the message is transmitted from the computer terminal to a mail server associated with a recipient address. Conventionally, email messages are typically routed to a recipient's mailbox via several computer servers. Each computer server routes packets associated with the email message one step closer to the recipient mailbox.

Conventionally, an email client may utilize a Mail Transfer Agent (MTA) and Simple Mail Transfer Protocol (SMTP) to send email from a computer terminal over a network, such as the internet, to a final destination address. There are two types of MTAs, a local MTA and a web-based MTA. The local MTA is installed on a computer terminal. The web-based MTA is accessed through a web browser.

The email client described herein may not provide an MTA. The email client may only be capable of composing or reading email messages. However, transmission, receiving and routing of an email message may be performed remotely from the computer terminal running the email client. In some embodiments, the email client running on the computer terminal may include an MTA. However, the local MTA may only be used to transmit unsecure email messages. Transmission, receiving and routing of an encrypted or otherwise secured email message may be performed remotely from the computer terminal running the email client or by other application programs.

The computer readable instructions stored on the computer terminal may include a treasury platform application program interface ("local treasury API"). The local treasury API may include front-end components and back-end components.

The front-end may refer to components of the local treasury API that the user interacts with directly. The front end may include text colors and styles, images, graphs and tables, buttons, colors and navigation menu. The front end may include structure, design, behavior, and content of user facing components of the local treasury API. Illustrative programming languages for creating the front-end may include hypertext markup language ("HTML"), cascading style sheets ("CSS"), and JavaScript programming languages.

The back-end may refer to components of the local treasury API that stores and arranges data. The back-end may include components of the local treasury API that are accessed by users through the front end. Back-end functionality may include encrypting an email message, packaging an email message or converting an email message into a secure format that is consumable by a treasury platform. Illustrative programming languages for creating back-end components may include, hypertext preprocessor ("PHP"), C++, Java and Python.

The local treasury API may receive an email message composed by the local email client. The local treasury API may establish a secure channel from the local computer terminal to a digital treasury platform hosted on a remote server.

The digital treasury platform may be computationally robust to service over 475,000 active users. The digital treasury platform may provide enhanced security and encryption features for secure access to the financial services provide by the platform. Exemplary financial services provided by the digital treasury platform may include managing payments, receipts, liquidity, investments, foreign and domestic trading activity and managing other commercial banking activity. Users may be able to connect to the digital treasury platform via desktop, mobile app, APIs and file transfer. The digital treasury platform may allow users to electronically sign and exchange documents online and track service requests in real time.

The local treasury API may transmit the email message from the local computer terminal to the digital treasury platform using a secure channel. In some embodiments, the local treasury API may encrypt contents of the email message.

The system may utilize public/private key cryptography, or asymmetric cryptography to encrypt email messages. Such a cryptography scheme may use a pair of public and private keys. The public key may be publicly disseminated, and the private key is kept secret. In some embodiments, symmetric key algorithms may be utilized. Symmetric key algorithms require a secure channel for exchange of one or more keys between the systems or parties.

The system may utilize asymmetric cryptography to automatically encrypt contents of an email message. The email message may be encrypted with a public key. The message cannot be decrypted by a system that does not have access to the private key paired to the public key used to encrypt the email message. The system may utilize digital signatures to automatically verify authenticity of the email message.

The email message may be digitally signed using a private key. The authenticity of the digital signature applied to the email message by a private key can be verified by a public key paired to the private key. The digital signature may mathematically binds the private key and contents of the email message. Verification of the digital signature will fail for any other message, no matter how similar to the original email message. Verification using the public key confirms that a sender or system that transmitted the email message had authorized access to the private key. The valid digital signature may confirm the email message has not been tampered with.

The local treasury API may package the email message composed by the local email client in a secure wrapper. The secure wrapper may include applying a digital signature to the email message. The secure wrapper may require a recipient or receiving system to validate the digital signature before displaying contents the email message. A key used to validate a digital signature may correspond to user credentials for accessing a remote treasury platform.

For example, the local treasury API may package the email message within a container that is encrypted using a public key. The public key may be selected based on an intended recipient of the email message. The public key may be paired to private key that corresponds to credentials of the intended recipient for accessing the digital treasury platform. The digital treasury platform may determine whether the recipient of the email is currently logged into the digital treasury platform using the credentials. In response to detecting that the recipient is logged in, the digital treasury platform may utilize the recipient's access credentials as a private key for extracting the email message from the encrypted container. After successful decryption, the digital treasury platform may alert the recipient that the email message is available in the recipient's mailbox.

In some embodiments, the local treasury API may automatically encrypt contents of the email message received from a local email client. Contents of the email message may be encrypted using a hash function. The hash function may utilize a sender's or recipient's credentials (e.g., a private key) combined with contents of the email message to generate a target hash value. The hash function may be programmed to generate a target hash value that can be verified by a public cryptographic key.

The digital treasury platform may use a private or public key to verify a target hash value associated with an email message and confirm that the email message was signed with a valid private key. Changing contents of the email message, even replacing a single letter, will change the target hash value and cause verification of the email message to fail. In an asymmetric private/public key system, it may be computationally infeasible for anyone who does not know the private key to deduce the target hash value from publicly available information. Thus, the authenticity of the email message can be validated by the digital treasury platform. In some embodiments, a public/private key pair may be generated for each email message routed by the digital treasury platform.

A technical challenge associated with use of public key cryptography is confidence/proof that a particular public key is authentic, that the public key is validly associated with a trusted system and has not been tampered with or replaced by a malicious third party. A possible solution to this problem is to use a public key infrastructure (PKI), in which one or more third parties certify ownership of private/public key pairs. The digital treasury platform may be a secure system that manages ownership of private/public key pairs.

The system described herein may utilize the digital treasury platform to securely store the public and private key pairs. The local treasury API may initiate a secure communication channel from the local computer terminal to the digital treasury system. In some embodiments, an email message sent from the local treasury API to the digital treasury platform may only be accessible to a recipient when the recipient is logged into the digital treasury platform via the treasury API.

After the digital treasury system validates credentials of the recipient, the email message may be displayed within an email client running on the recipient's local computer terminal. In some embodiments, the email client may only display an alert that a new email message is available. The recipient may only be able to view the email message via a secure communication channel to the digital treasury platform established by the local treasury API.

A secure communication channel linking the sender's local computer terminal and the digital treasury system may be a first instance of the secure channel. The local treasury API may be a first local treasury API running on the sender's local computer terminal. The digital treasury platform may receive the email message from the sender's local computer terminal using the first secure channel initiated by the first local treasury API.

In response to receiving the email message over the first secure channel, the digital treasury platform may initiate a second instance of the secure channel. The second instance of the secure channel may link the digital treasury platform to the recipient's local computer terminal. The digital treasury platform may utilize the second instance of the secure channel to forward the email message to a second local treasury API running on the recipient's local computer terminal.

In some embodiments, the recipient of the email message may be required to log in to the digital treasury platform to view the email message. In some embodiments, a local copy of the email message may not be transmitted to the recipient's local computer terminal. The recipient may receive a notification within a local email client running on the recipient's local computer terminal informing the recipient that the email message has been received by the digital treasury platform.

In some embodiments, the email message may not be viewable by the recipient within a local email client unless the local email client receives confirmation from a second local treasury API running on the recipient's local computer terminal that the second local treasury API has successfully logged onto the digital treasury platform using credentials of the recipient. In some embodiments, a sender of the email message must be logged into the digital treasury platform for the recipient to view the email message.

A system for automating transmission of encrypted email messages is provided. The system may include an email client running locally on a computer terminal ("local email client"). The local email client may include computer readable instructions, that when executed by one or more processors on the computer terminal provide software tools for composing and viewing an email message. The system may include a treasury platform application program interface operating locally on the computer terminal ("local treasury API").

The local treasury API may include computer readable instructions, that when executed by the one or more processors on the local computer terminal receives an email message composed by the local email client. The local treasury API may encrypt contents of the email message. The local treasury API may encrypt contents of the email message using public/private key cryptography. The local treasury API may establish a secure communication channel from the local computer terminal to a digital treasury platform hosted on a remote server.

The secure channel may utilize public/private key cryptography to ensure that email messages are transmitted through the channel confidentially and without modification. Illustrative secure communication channels may be created on an open networked environment (e.g., the internet) using Transport Layer Security (TLS) or Secure Sockets Layer (SSL) protocols. The local treasury API may transmit the email message from the local computer terminal to the digital treasury platform using the secure channel.

The local computer terminal may be connected to a computer network. The email message may be addressed to a recipient having a first destination address that associated with a computer terminal outside the first computer network. When the first destination address is outside the first computer network, the local treasury API may automatically encrypt the contents of the email message and send the email message to the digital treasury platform using the secure channel. The digital treasury platform may then inform the recipient that the email message is available for viewing in the recipient's mailbox on the digital treasury platform.

In some embodiments, the digital treasury platform may wait for the recipient to logon to the digital treasury platform. In response to authenticating logon credentials of the recipient, the digital treasury platform may initiate a secure channel to a local treasury API running on the recipient's local computer terminal. Using the secure channel, the digital treasury platform may transmit the email message to a local email client running on the recipient's local computer terminal. When the recipient logs off the digital treasury platform, all email message transmitted to the local email client over the secure channel may be deleted from the recipient's local computer terminal. The deleted email messages may still remain viewable from within the digital treasury platform.

An email message may be addressed to two or more destination addresses. For example, an email message may be addressed to a first and a second destination addresses. The second destination address may be associated with a computer terminal that is connected to the same network as the sender's local computer terminal. The local treasury API may transmit the email message from the sender's local computer terminal to the digital treasury platform using the secure channel. Because the destination address is on the same network as the sender's computer terminal, the local treasury API may skip encryption of contents of the email message.

The computer network of the sender and recipient computer terminals may be on a network trusted by the digital treasury platform. Due to the computationally complex nature of asymmetric encryption algorithms, the time taken to encrypt large documents or files to be transmitted can be relatively long and computationally intensive. Skipping encryption of the contents of the email message may improve operational efficiency of routing secure emails.

The local treasury API or digital treasury platform may determine whether the sender computer terminal and recipient computer terminal are on the same network. Whether the sender computer terminal and recipient computer terminal are on the same network may be determined based on an IP address and a subnet mask assigned to each computer terminal. The subnet mask may determine which part of the terminal's IP address belongs to the network and which part that belongs to a host addresses.

For example, if two computer terminals do not share the same subnet mask, they are not on the same network. Even if the two terminals are each associated with an identical subnet mask, the IP addresses of each terminal should be compared together with the associated subnet mask. For two terminals to reside on the same network, when comparing the two IP address/subnet combinations, the addresses must match for any section where the subnet value is 255. If a subnet is 255.255.255.0, the first three sections of each terminal's IP address should match (reading left to right) if they are on the same network.

In some embodiments, a sender may include a signal to the local treasury API whether to encrypt an email message. An illustrative signal may include a text string in a subject line of the email message. For example, the sender may include the words CONFIDENTIAL in a subject line of the email message. In response to detecting the word CONFIDENTIAL in the subject line, the local treasury API may automatically encrypt contents of the email message.

The local treasury API may encrypt the contents of the email message into a first format. After the email message is received by the digital treasury platform, the email message may be encrypted into a second format. The digital treasury platform may send the email message in the second format to a local treasury API running on the recipient's computer terminal. The local treasury API may in turn decrypt the email message and present the decrypted email message to the recipient within an email client running on the recipient's local computer terminal.

Encryption of the email message into the first format may be based on using the sender's credentials for accessing the digital treasury platform as a private key. Encryption of contents of the email message into the second format may be based on using the recipient's credentials for accessing the digital treasury platform as a private key. The digital treasury platform may be a secure repository that stores all credentials corresponding to private keys.

The sender's computer terminal may be a first computer terminal and a first instance of the local treasury API may be running on the first computer terminal. The recipient's computer terminal may be a second computer terminal and a second instance of the local treasury API may be running on the second computer terminal. When the second instance of the local treasury API running on the first computer terminal is unable to detect whether the sender is logged into the digital treasury platform, the transmission of the email message may be rejected. The first instance of the local treasury API may generate an undeliverable message that is displayed within the local email client running on the first computer terminal.

In some embodiments, encryption of the email message into the first format may be based on the recipient's credentials for logging onto the digital treasury platform. When the first instance of the local treasury API is unable to detect that the recipient is logged onto the digital treasury platform, the transmission of the email message to the recipient may be rejected. The first instance of the local treasury API may generate an undeliverable message that is displayed to a sender of the email message within the local email client running on the first computer terminal.

A recipient of the email message may be automatically provided access to encrypted contents of the email message by a second instance of the location treasury API running on the second computer terminal. The second instance of the location treasury API may automatically decrypt the email message in response to detecting that the recipient is logged onto the digital treasury platform.

A computer implemented method for automating transmission of encrypted email messages is provided. The method may include extracting computer readable instructions stored in a non-transitory medium and executing the computer readable instructions that program one or more processors to implement the method steps.

The method may include intercepting an email message composed by an email client running locally on a computer terminal. The methods may include encrypting contents of the email message into a hash value. The encrypting may be based on credentials of a recipient of the email message for accessing a digital treasury platform hosted on a remote server. Methods may include establishing a secure communication channel from the sender's computer terminal to the digital treasury platform. Methods may include transmitting the email message from the sender's computer terminal to the digital treasury platform using the secure channel.

The sender's computer terminal may be a first computer terminal. The secure channel may be a first secure channel. Methods may include detecting that the recipient has logged into the digital treasury platform from a second computer terminal using the access credentials of the recipient. Methods may include initiating a second secure channel from the digital treasury platform to the second computer terminal. Methods may include pushing an alert to a local email client running on the second computer terminal informing the recipient that email message has been sent to the recipient from a sender.

In response to a request from the second computer terminal to access the email message, methods may include providing the recipient access to the email message on the second computer terminal without transmitting a copy of the email message to the second computer terminal. The email message may only be stored on the digital treasury platform. The digital treasury platform may be more secure than the second computer terminal. The second instance of the local treasury API running on the second computer terminal may open a secure communication channel to the digital treasury platform that allows the recipient to view the email message on the digital treasury platform.

Methods may include automatically decrypting contents of the email message using the access credentials of the recipient. The access credentials of the recipient may be a private key. Methods may include synchronizing recipient access to the email message from one or more computer terminals. For example, when the recipient logs on the digital treasury platform and views an email message, the email message may be marked as "read" when the recipient accesses the digital treasury platform using a different communication channel. Other illustrative channels for accessing the digital treasury platform include a mobile application or web-based portal.

Methods may include automatically encrypting contents of an email message based on a text string in a subject line of the email message. For example, the sender may include the words CONFIDENTIAL in a subject line of the email message. In response to detecting the word CONFIDENTIAL in the subject line, the local treasury API may automatically encrypt contents of the email message.

A system for automatically transforming unsecure email message into an encrypted message is provided. The system may include a digital treasury platform hosted on a remote server. The digital treasury system may automatically encrypt messages communicated between users of the digital treasury system. The system may include an unsecure email client running on a sender's computer terminal. The email client may be unsecure because it otherwise transmits email messages in plain text.

The system may include an artificial intelligence ("AI") software engine. The AI engine may detect an email message formulated by the unsecure email client. The AI engine may intercept the email message before the email message leaves the computer terminal. The AI engine may redirect the email message to the digital treasury platform. In response to receiving the email message formulated by the unsecure email client, the treasury platform may convert the email message into a secure message that is only accessible from within the digital treasury platform.

In some embodiments, the AI engine may encrypt the intercepted email message before transmitting the intercepted email message off the computer terminal. In some embodiments, the AI engine may reformat the intercepted email message into a structure that is consumable by the digital treasury platform before transmitting the intercepted email message off the computer terminal.

For example, the digital treasury platform may only accept encrypted messages. The digital treasury platform may only accept messages that are digital signed by a local treasury API. The local treasury API may digital sign a message using a private key. The digital treasury platform may verify the digital signature using a public key. The digital treasury platform may only accept messages that are in a proprietary data format.

The digital treasury platform may operate on a remote computer server. The AI engine may be configured to transmit the intercepted email message from the computer terminal to the digital treasury platform by automatically establishing a secure connection to a user interface of the treasury platform active on the computer terminal.

When the AI engine fails to detect an active user interface of the treasury platform on the computer terminal, the AI engine may abort transmission of the intercepted email message and generate an undeliverable message. The AI engine may display the undeliverable message within the unsecure email client. The AI engine may pass successfully intercepted email messages from the unsecure email client to a user interface of the treasury platform active on the computer terminal.

The AI engine may convert an intercepted email message into a proprietary encryption format utilized by the digital treasury platform. The user interface of the digital treasury platform may convert the email message into the secure message or other format consumable by the digital treasury platform. The user interface of the treasury platform may transmit the converted email message off the computer terminal.

The AI engine may determine whether the intercepted email message includes a destination address registered with the digital treasury platform. When the intercepted email message includes a destination address registered with the digital treasury platform, the AI engine may redirect the intercepted message to the digital treasury platform. The AI engine, in response to failing to detect the registered destination address, may redirect the unsecure message back to the originating unsecure email client. The originating unsecure mail email client may then transmit the email message off the computer terminal and onto the destination address.

In some embodiments, the AI engine may intercept all email messages initiated by an unsecure email client. In some embodiments, the AI engine may determine whether to intercept the email message based on content in a subject line of the email message. The AI engine may determine whether to intercept the email message based on whether the email message includes an attachment that resides in a physical memory location on the computer terminal that is allocated to the treasury platform. The AI engine may determine whether to intercept the email message based on any suitable characterizing of an email message.

The AI engine may utilize one or more machine learning algorithms or other forms of artificial intelligence to determine when to intercept an email message. Illustrative machine learning techniques that may be employed by the AI engine include AdaBoost, Naive Bayes, Support Vector Machine, Random Forests, Artificial Neural Networks, Deep Neural Networks and Convolutional Neural Networks.

A system for transforming unsecure email messages into encrypted messages is provided. The system may include a treasury platform API that provides a secure communication channel to a treasury platform hosted on a remote computer server. The system may include an email client application resident on a computer terminal.

The system may include an artificial intelligence ("AI") software engine. The AI engine may detect an email message formulated by the unsecure email client. The AI engine may intercept the email message. The AI engine may redirect the email message to the treasury platform API. In response to receiving the email message formulated by the unsecure email client, the treasury platform API may establish a secure communication channel to the treasury platform hosted on the remote computer server.

The treasury platform API may transmit the email message off the computer terminal via the secure communication channel. The treasury platform API may transmit the intercepted email message to the treasury platform. The upon receipt of the email message, the treasury platform may determine whether the email message includes a destination address registered within the treasury platform. When the intercepted email message includes the registered destination address, the treasury platform may redirect the intercepted message to the destination address within treasury platform.

In response to failing to detect the registered destination address, the treasury platform may initiate a virtual instance of the email client resident on the sender's computer terminal. Using the virtual instance of the email client, the treasury platform may transmit the email message from the treasury platform to the destination address.

An email client that receives the email message forwarded by the treasury platform computer terminal may process the received email message as if it has been received directly from the sender's email client. For example, the treasury platform may transmit the intercepted email message to the destination address using a simple mail transport protocol.

The AI engine may determine whether to forward the email message to the treasury platform based on content in a subject line of the email message. For example, the sender may include the words CONFIDENTIAL in a subject line of the email message. In response to detecting the word CONFIDENTIAL in the subject line, the AI engine may automatically encrypt contents of the email message.

An artificial intelligence ("AI") software engine for automatically transforming unsecure email messages into encrypted messages is provided. The AI engine may include computer readable instructions. The computer readable instructions, when executed by one or more processors of a computer system may detect an email message formulated by an unsecure email client.

The AI engine may intercept the email message before the email message is released onto a physical network layer. The physical network layer may include components that transmit data over physical media. The physical network layer may define the electrical and physical specifications for network connected devices. Illustrative electrical and physical specifications may include layout of pins, voltages, and cable specifications. Hubs, repeaters and network adapters are physical-layer devices.

The AI engine may initiate a secure communication channel to a digital treasury platform hosted on a remote computer server. The AI engine may package the email message in accordance with encryption and security requirements of the digital treasury platform. The AI engine may release the email message onto the physical network layer after it has been packaged in accordance with the encryption and security requirements of the digital treasury platform.

The AI engine may apply one of a plurality of encryption schemes to the email message. The AI engine may apply an encryption scheme based on a destination address associated with the email message. For example, when the destination address is associated with a trusted node, a lower-level encryption may be applied. Lower-level encryption may include packaging the email message within a secure container but not encrypting contents of the email message itself.

The AI engine may package the email message in accordance with encryption and security requirements of the digital treasury platform such that the packaged email message is converted into a proprietary encryption format utilized by the treasury platform. The AI engine may determine that a destination address associated with the email message does not have a corresponding account on the digital treasury platform. In such circumstances, the AI engine may package the email message such that when the email message is received by the digital treasury platform, the treasury platform will forward the email message to the destination address without the encryption and security requirements of the treasury platform.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system architecture 100. Architecture 100 includes sender local computer terminal 101. Sender terminal 101 may include an unsecure local email client 111. Local email client 111 may provide a user interface for managing email messages.

Local email client 111 may be capable sending and receiving email messages using a variety of protocols. Commonly used protocols for email communication include Post Office Protocol (POP), Internet Message Access Protocol (IMAP) and Simple Mail Transfer Protocol (SMTP). However, in architecture 100, local email client 111 does not control transmission and receipt of email messages. Instead, to improve security of email communication, local email client 111 interacts with treasury platform API 113.

Treasury platform API 113 may receive email messages formulated by email client 113. Treasury platform API 113 may initiate secure communication channel 103 to digital treasury payment platform 105. Digital treasury platform 105 may be computationally robust to service over 475,000 active users. Digital treasury platform 105 may provide enhanced security and encryption features for users to securely access the financial services provide by the platform.

In some embodiments, treasury platform API 113 may convert an email composed by unsecure email client 111 into a format that is consumable by digital treasury platform 105. Email client 111 may be configured to "send" the email message in response to an instructions from a user. However, treasury platform API 113 may intercept the email message before it is transmitted off computer terminal 101.

The email message may be intercepted by treasury platform API 113 based on certain criteria present in the email message. For example, the email message may be intercepted because it includes a notification in the subject line (e.g., the word "CONFIDENTIAL") or is marked as being sent with "high importance." Other illustrative criteria may include a destination address of a recipient that matches an email address linked to an account on digital treasury platform 105.

The treasury platform API 113 may reformulate the email message composed by email client 111 in a format consumable by digital treasury platform 105. The reformulated email message may include encryption or other security features. Treasury platform API 113 may then transmit the reformulated email message to digital treasury platform 105 using secure channel 103. Illustrative secure channels may be created on an open networked environment using Transport Layer Security (TLS) or Secure Sockets Layer (SSL) protocols.

In some embodiments, digital treasury platform 105 may initiate secure communication channel 107 to inform recipient local computer terminal 109 that the email message is available for viewing within digital treasury platform 105. In some embodiments, digital treasury platform 105 may initiate secure communication channel 107 and route the reformulated email message to recipient computer terminal 109 over secure communication channel 107.

In some embodiments, the reformulated email message presented within digital treasury platform 105 may not disclose a sender of the email message. In such embodiments, recipient computer terminal 109 may initiate secure communication channel 107 for routine access to digital treasury platform 105. In response to detecting access from digital treasury platform 105, digital treasury platform 105 may inform recipient local computer terminal 109 that a received email message is available for viewing.

Figure 2:
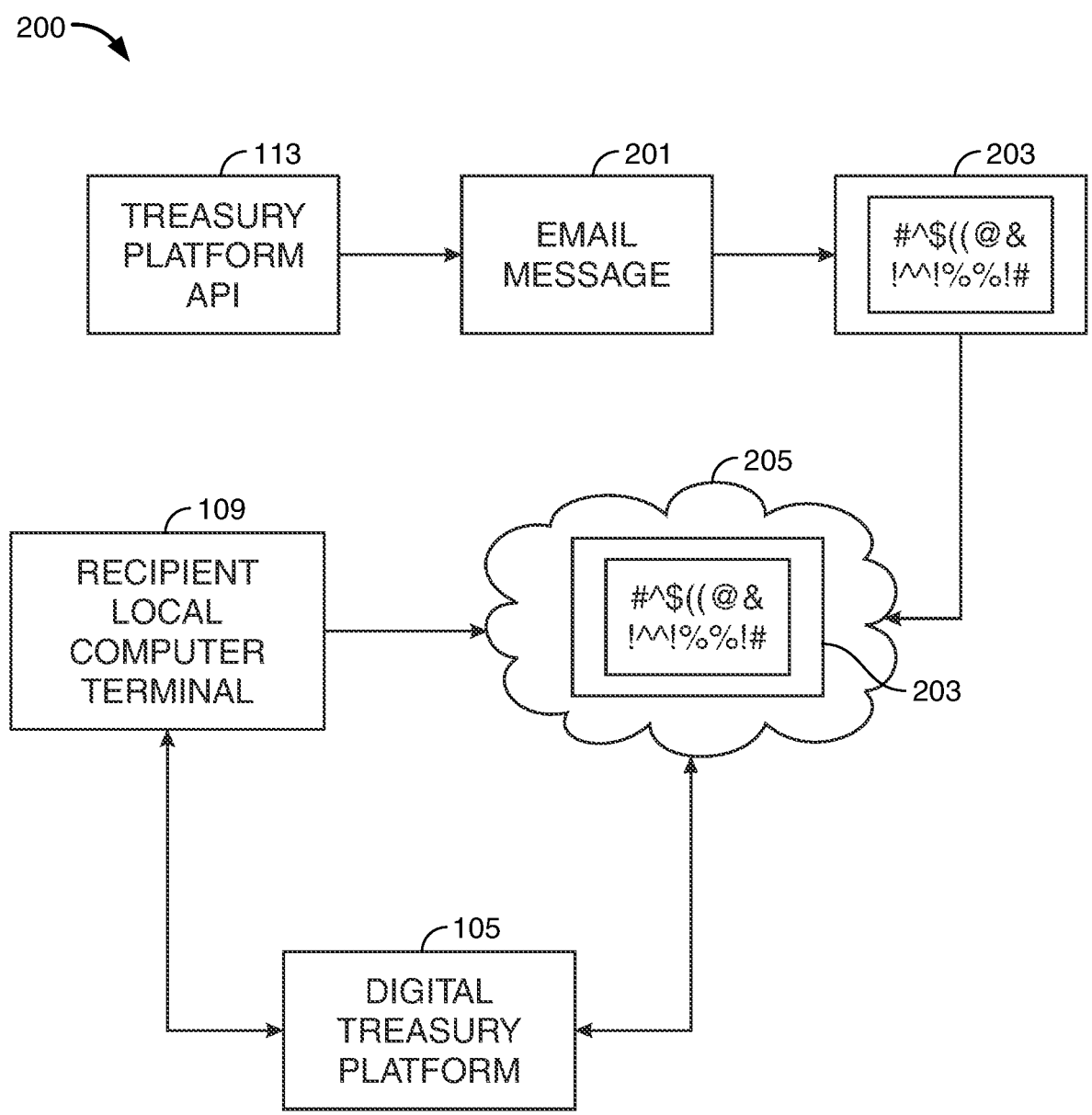
FIG. 2 shows illustrative components of a system architecture in accordance with the principles of the disclosure.

FIG. 2 shows illustrative system architecture 200. Architecture 200 includes treasury platform API 113. Treasury platform API 113 may intercept email message 201 formulated by local email client 111 (shown in FIG. 1). Architecture 200 shows that treasury platform API 113 has converted email message 201 into encrypted email message 203. Encrypted message 203 may be consumable by digital treasury platform 105.

For added security, treasury platform API 113 may also encapsulate encrypted message 203 within secure container 205. To access email message 201, a recipient must provide a predetermined key. The predetermined key may decrypt encrypted message 201. The predetermined key may unlock secure container 205. In some embodiments, credentials for accessing digital treasury platform 105 may be used to create encrypted email message 203. The credentials for accessing digital treasury platform 105 may be used to generate secure container 203.

For example, treasury platform API 113 may encrypt email message 201 and package email message 201 within secure container 203 using a public cryptographic key. The public cryptographic key may be associated with credentials of a sender of email message 201. The public cryptographic key may be associated with credentials of an intended recipient of email message 201. The public cryptographic key may be paired to a private cryptographic key. The private cryptographic key may correspond to a recipient's credentials needed to access digital treasury platform 105.

Digital treasury platform 105 may determine whether the recipient of email message 201 has used valid credentials to log into digital treasury platform 105. In response to detecting that the recipient has used valid credentials, digital treasury platform 105 may extract encrypted email message 203 from secure container 205 and decrypt email message 203. Digital treasury platform 105 may alert the recipient that email message 201 has been decrypted and is available for viewing. In some embodiments, via a treasury platform API, digital treasury platform 105 may securely present email message 201 within an email client running on recipient computer terminal 109. Such access may be preferably less complex because the recipient may already be logged into digital treasury platform 105.

Figure 3:
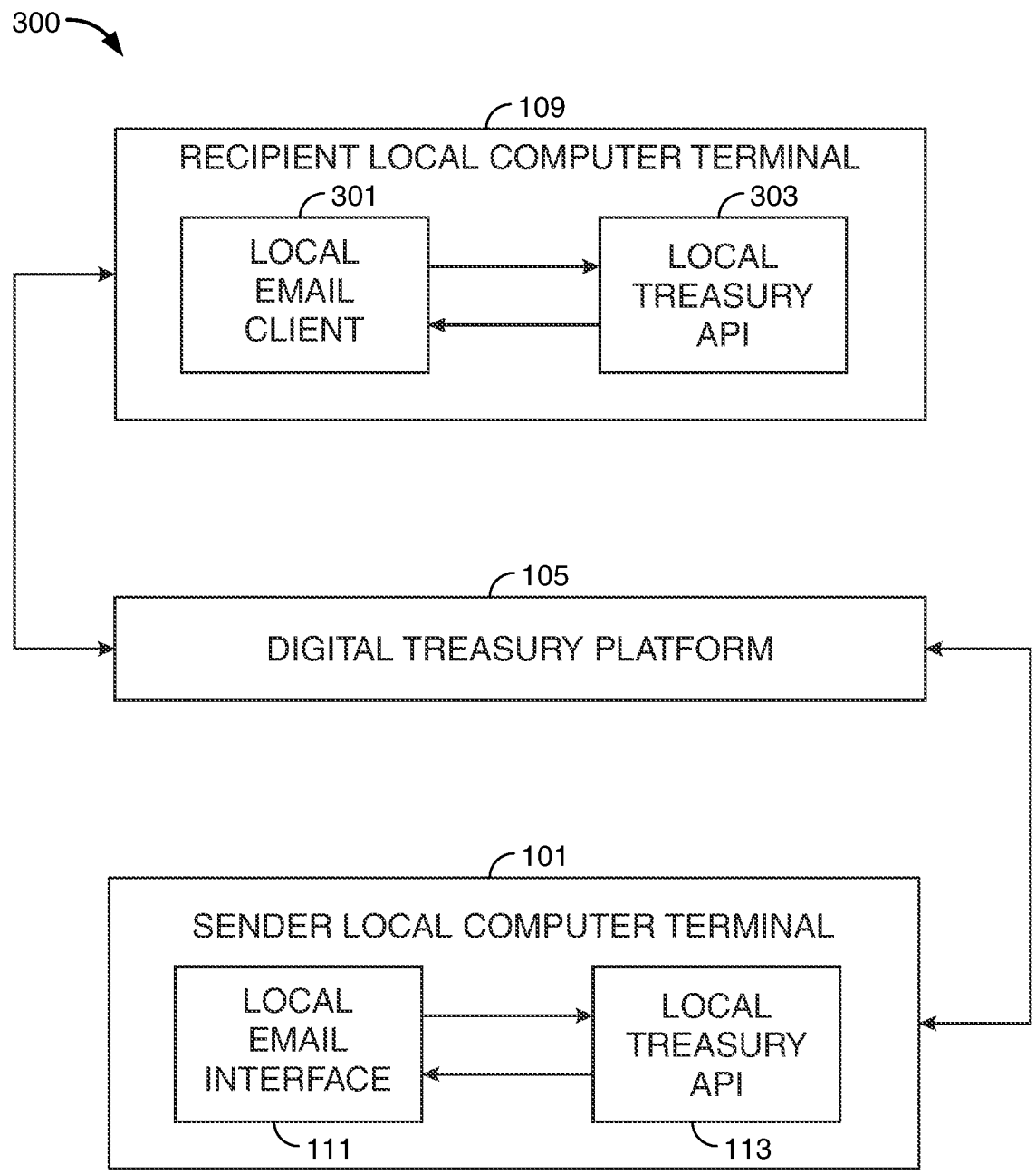
FIG. 3 shows illustrative components of a system architecture in accordance with the principles of the disclosure.

FIG. 3 shows illustrative system architecture 300. Architecture 300 includes recipient local computer terminal 109. Recipient local computer terminal 109 includes a local email client 301 and local treasury platform API 303. Local treasury platform API 303 may intercept email messages composed by local email client 301. Local treasury platform API 303 may also establish a secure connection to digital treasury platform 105.

Local treasury API 303 may provide secure access to digital treasury platform 105. Local treasury API 303 may receive email messages that have been transmitted by sender computer terminal 101 to recipient computer terminal 109. Local treasury API 303 may utilize functionality of local email client 301 to display email messages received from digital treasury platform 105. A recipient may view email messages, compose responses to email messages using email client 301. However, communication of email messages will be securely controlled by interaction between local treasury API 303 and digital treasury platform 105.

Local treasury API 303 may update and sync folders created by a recipient within email client 301. For example, when a recipient reads an email message received from digital treasury platform 105, local treasury API 303 may cause email client 301 to mark that message as read. In some embodiments, copies of email message received from digital treasury platform 105 may not be stored locally on recipient computer terminal 109. Local treasury API 303 may regularly refresh content presented by email client 301 and provide the appearance that the email messages are stored locally on recipient computer terminal 109. Local treasury API 303 may format email messages and associated metadata received from digital treasury platform 105 for display by email client 301.

Local treasury API 303 may utilize access credentials to encrypt or decrypt email messages stored on digital treasury platform 105. For example, email messages encrypted or routed by digital treasury platform 105 may only be viewable within email client 301 when recipient computer terminal 109 is logged onto digital treasury platform 105. In some embodiments, for added security, email messages encrypted or routed by digital treasury platform 105 and transmitted by sender computer terminal 101 may only be viewable within email client 301 when recipient computer terminal 109 and sender computer terminal 101 are both logged onto digital treasury platform 105.

Figure 4:
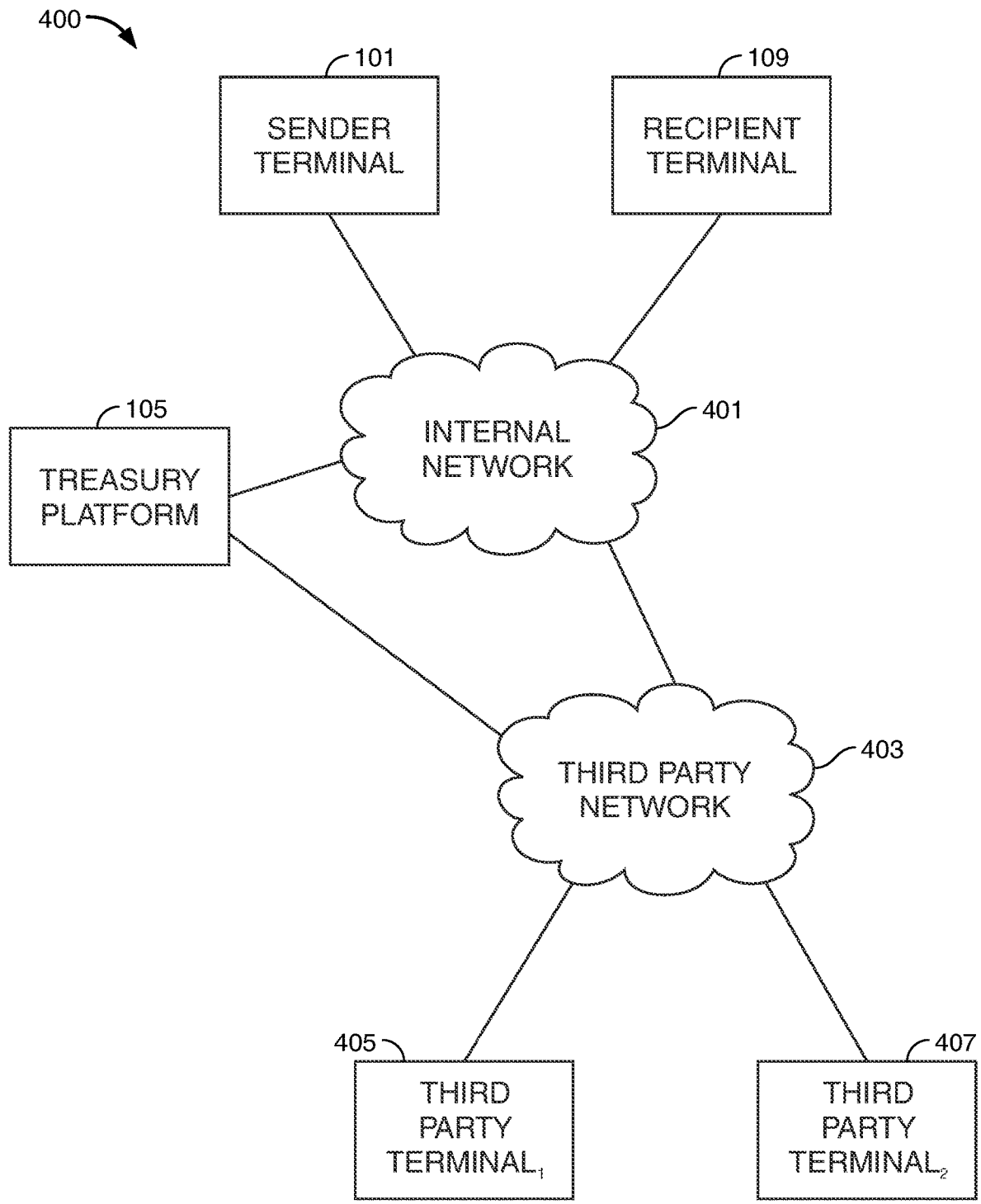
FIG. 4 shows illustrative components of a system architecture in accordance with the principles of the disclosure.

FIG. 4 shows illustrative system architecture 400. System architecture 400 includes sender terminal 101 and recipient terminal 109. Both sender terminal 101 and recipient terminal 109 are connected to internal network 401. Digital treasury platform 105 is also shown are being connected to internal network 401. Internal network 401 may be a network trusted by digital treasury platform 105.

When email messages are sent between terminals 101 and 109 on internal network 401, digital treasury platform 105 may reduce the level of security applied to those email messages. For example, such email messages may be ensconced in a secure container such as container 205 (shown in FIG. 2) but the contents of the email messages may not be encrypted. Treasury APIs 113 and 303 may dynamically determine how to secure an email messages based on a whether the email message will be transmitted off a trusted network, such as internal network 401.

An email message may be routed via digital treasury platform 105 through third-party network 403 to one or more of terminals 405 or 407. In such scenarios, digital treasury platform 105 may apply a relatively higher-level encryption and security to those email messages. In some embodiments, when an email message will be routed through third-party network 403, terminals 405 and 407 may only be allowed to access the email message by logging into digital treasury platform 105.

In some embodiments, email messages routed through third-party network 403 may not be displayed on terminals 405 or 407 using a local email client running on those terminals. Terminals 405 and 407 may be alerted that an email message has been received by digital treasury platform 105 and that terminals 405 or 407 must logon to digital treasury platform 105 to view the email message.

Figure 5:
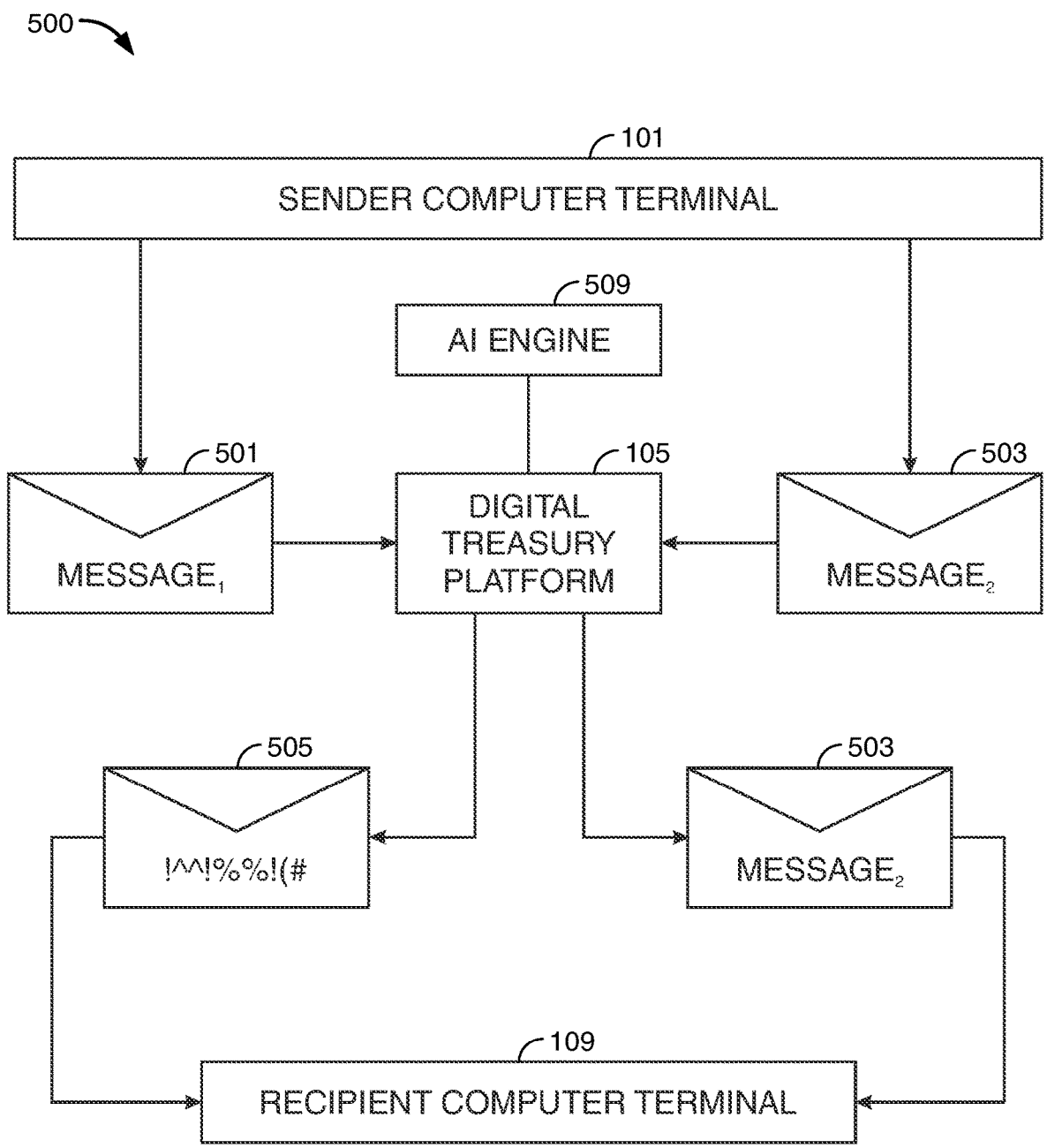
FIG. 5 shows illustrative components of a system architecture in accordance with the principles of the disclosure.

FIG. 5 shows illustrative AI routing process 500. Process 500 shows that sender computer terminal 101 has transmitted email messages 501 and 503. Both messages 501 and 503 are intercepted by treasury API 113 (shown in FIG. 1) running on sender computer terminal 101. Treasury API 113 routes messages 501 and 503 to digital treasury platform 105. At digital platform 105, AI engine 509 determines how to routes messages 501 and 503 to recipient computer terminal 109. In some embodiments, AI engine 509 may be included in treasury APIs 113 and/or 303.

Process 500 shows that AI engine 509 converts email message 501 into encrypted message 505. AI engine 509 may detect that message 501 includes a flag or other indicator that it contains confidential information. AI engine 509 may examine contents of message 501, including any attachments. Encrypted message 505 may only be viewed via a treasury API 303 (shown in FIG. 3) running on recipient computer terminal 109. Treasury API 303 may confirm that recipient computer terminal 109 is validly logged into digital treasury platform 105 before decrypting email message 505. Treasury API 303 may prevent message 505 from being forwarded to another computer terminal.

On the other hand, AI engine 509 may determine that message 503 does not include any confidential information. AI engine 509 may authorize digital treasury platform 105 to route message 503 to recipient computer terminal 109 without applying any encryption, thereby reducing a computational load imposed on the sender computer terminal 101 or digital treasury platform 105. Message 503 may be routed to and stored locally on recipient computer terminal 109. After being received by recipient computer terminal 109, message 503 may be unrestrictedly forwarded by email client 301 (shown in FIG. 3).

Figure 6:
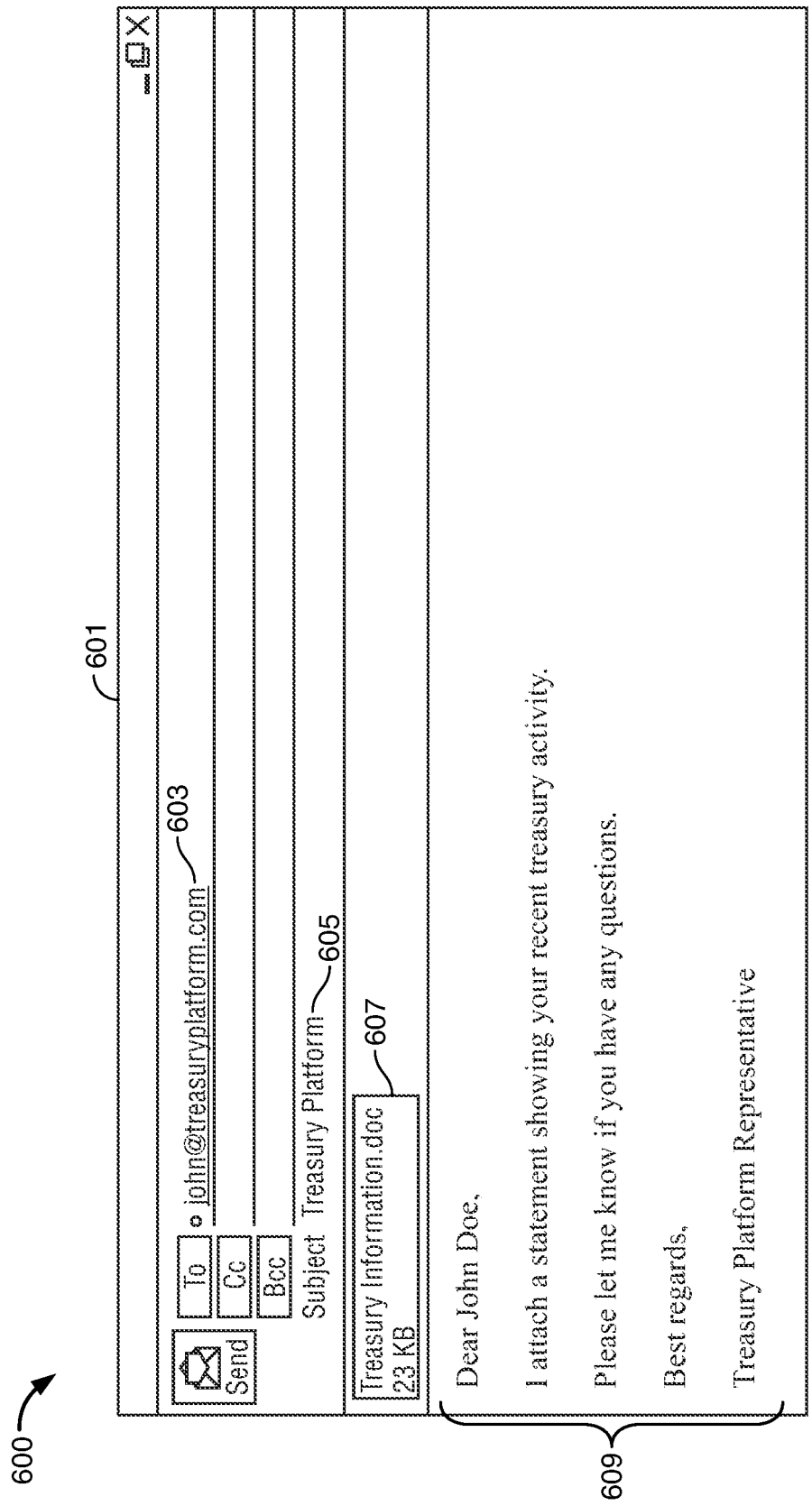
FIG. 6 shows illustrative components of an email message in accordance with the principles of the disclosure.

FIG. 6 shows illustrative email message 600. FIG. 6 shows illustrative components of email message 600 that may be extracted by AI engine 509 for secure routing. Email message 600 is being sent to recipient 603. Because recipient 603 is associated with a domain "treasuryplatform.com" AI engine 509 may intercept and divert message 600 to digital treasury platform 105 for secure routing. AI engine 509 may also detect that a text string in subject line 605 indicates message 600 requires secure routing. AI engine 509 may detect that attachment 607 resides in a memory location that has been allocated to digital treasury platform 105 and therefore requires secure routing. AI engine may perform analysis of email message content 609 and determine that message 600 requires secure routing. AI engine 509 may utilize any suitable characteristics of message 600 to determine whether to apply secure routing techniques described herein.

Thus, apparatus and methods for SECURE EMAIL TRANSMISSION VIA TREASURY PORTAL have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for automating transmission of encrypted email messages, the system comprising:
an email client operating locally on a computer terminal, the email client comprising computer readable instructions, that when executed by a processor on the computer terminal provides user tools for composing and viewing an email message; and
a treasury application program interface (API) operating locally on the computer terminal, the treasury API comprising computer readable instructions, that when executed by the processor on the computer terminal, to:
receive the email message composed by the email client;
establish a secure channel from the computer terminal to a treasury platform hosted on a remote server;
encrypt the email message using a hash value based on a username and a password of a recipient of the email message for accessing the treasury platform; and
transmit the email message from the computer terminal to the treasury platform using the secure channel;
wherein, after the username and the password of the recipient are automatically verified, the email message is displayed within an instance of the email client running on the recipient's computer terminal when the recipient is logged onto the treasury platform.

2. The system of claim 1, wherein:
the treasury API packages the email message composed by the email client in a secure wrapper; and
the secure wrapper requires a recipient of the email message to provide credentials for accessing the treasury platform to view the email message.

3. The system of claim 1, wherein the secure channel is a first secure channel, wherein the treasury API is a first treasury API, and wherein the treasury platform further:
receives the email message over the first secure channel initiated by the first treasury API;
initiates a second secure channel; and
utilizes the second secure channel to forward the email message to a second treasury API running on a recipient's computer terminal.

4. The system of claim 1, wherein a recipient of the email message must logon to the treasury platform to view the email message.

5. The system of claim 4, wherein:
the recipient receives a notification in the second email client that the email message has been received by the treasury platform; and
the email message is not viewable by the recipient within the second email client unless the second email client receives confirmation from a second treasury API that the second treasury API has successfully logged onto the treasury platform using credentials of the recipient.

6. The system of claim 4, wherein, a local copy of the email message is never transmitted to a computer terminal of the recipient.

7. The system of claim 1, wherein a sender of the email message must be logged onto the treasury platform for the recipient to view the email message.

8. A system for automating transmission of encrypted email messages, the system comprising:
an email client operating locally on a computer terminal, the email client comprising computer readable instructions, that when executed by a processor on the computer terminal provides software tools for composing and viewing an email message; and
a treasury application program interface (API) operating locally on the computer terminal, the treasury API comprising computer readable instructions, that when executed by the processor on the computer terminal, to:
intercept the email message composed by the email client;
encrypt contents of the email message into a first format;
open a secure channel from the local computer terminal to a digital treasury platform hosted on a remote server; and
transmit the email message from the computer terminal to the digital treasury platform via the secure channel;
wherein, after the email message is received by the digital treasury platform, the email message is encrypted into a second format before the email message is forwarded from the digital treasury platform to a recipient; and wherein encryption of contents of the email message into the second format is based on credentials for accessing the digital treasury platform of the recipient of the email message.

9. The system of claim 8, wherein:

the computer terminal is connected to a computer network; and the email message is addressed to a destination address that is outside the computer network.

10. The system of claim 9, wherein the destination address is a first destination address and when the email message is addressed to a second destination address that is on the network, the treasury API:

transmits the email message from the computer terminal to the digital treasury platform using the secure channel; and skips encryption of contents of the email message.

11. The system of claim 8, wherein:

the computer terminal is a first computer terminal;

the treasury API is a first instance of the treasury API running on the first computer terminal; and the recipient of the email message is automatically provided access to encrypted contents of the email message in response to a second instance of the treasury API running on a second computer terminal detecting that the recipient is logged onto the digital treasury platform.

12. The system of claim 8 wherein:

encryption of the email message into the first format is based on credentials for logging onto the digital treasury platform of a sender of the email message;

when the treasury API is unable to detect whether the sender is logged into the digital treasury platform, the transmission of the email message is rejected; and the treasury API generates an undeliverable message that is displayed within the email client running on the computer terminal.

13. The system of claim 8 wherein:

the encryption of the email message into the first format is based on credentials for logging onto the digital treasury platform of a recipient of the email message;

when the treasury API is unable to detect that the recipient is logged onto the digital treasury platform, the transmission of the email message is rejected; and the treasury API generates an undeliverable message that is displayed to a sender of the email message within the email client.

14. A computer implemented method for automating transmission of encrypted email messages, the method comprising, extracting computer readable instructions stored in a non-transitory medium and executing the computer readable instructions that program one or more processors to:

intercept an email message composed by an email client running locally on a first computer terminal;

encrypt contents of the email message into a hash value using credentials of a recipient of the email message for accessing a digital treasury platform hosted on a remote server;

establish a fir secure channel from the computer terminal to the digital treasury platform;

transmit the email message from the computer terminal to the digital treasury platform using the secure channel;

detect that the recipient has logged into the digital treasury platform from a second computer terminal using the credentials of the recipient;

initiate a second secure channel from the digital treasury platform to the second computer terminal;

push an alert to the second computer terminal informing the recipient that email message has been sent to the recipient from a sender; and in response to a request from the second computer terminal to access the email message, provide the recipient access to the email message on the second computer terminal without transmitting a copy of the email message to the second computer terminal.

15. The computer implemented method of claim 14, the computer readable instructions further program the one or more processors to:

automatically decrypt the contents of the email message using the credentials of the recipient; and synchronize recipient access to the email message from one or more computer systems.

16. The computer implemented method of claim 14, the computer readable computer readable instructions further program the one or more processors to automatically encrypt the contents of the email message such that the email message can only be decrypted when the email message is accessed from within the digital treasury platform.

\* \* \* \* \*